United States Patent [19]

O'Brien et al.

[11] Patent Number: 5,205,405

[45] Date of Patent: Apr. 27, 1993

[54] COMPACT DISC HOLDER AND PACKAGE THEREFOR

[75] Inventors: Patrick J. O'Brien, Hackensack, N.J.; Larry Durham, Terre Haute, Ind.

[73] Assignee: Ivy Hill Corporation, New York, N.Y.

[21] Appl. No.: 698,201

[22] Filed: May 10, 1991

[51] Int. Cl.⁵ .............................................. B65D 85/57
[52] U.S. Cl. ..................................... 206/310; 206/312
[58] Field of Search ............... 206/307, 309, 310, 311, 206/312, 313, 444

[56] References Cited

U.S. PATENT DOCUMENTS

| | | | |
|---|---|---|---|
| 4,463,849 | 8/1984 | Prusak et al. | 206/309 X |
| 4,463,850 | 8/1984 | Gorog | 206/309 |
| 4,620,630 | 11/1986 | Moss | 206/313 X |
| 4,655,344 | 4/1987 | Ackeret | 206/309 X |
| 4,694,954 | 9/1987 | Moss | 206/312 X |
| 4,694,957 | 9/1987 | Ackeret | 206/309 |
| 4,709,812 | 12/1987 | Kosterka | 206/310 |
| 5,011,010 | 4/1991 | Francis et al. | 206/309 X |
| 5,088,599 | 2/1992 | Mahler | 206/313 |

OTHER PUBLICATIONS

The Packaging of CDs, *Consumer Reports* (Mar. 1991).

Primary Examiner—Steven N. Meyers
Assistant Examiner—Jacob K. Ackun, Jr.
Attorney, Agent, or Firm—Amster, Rothstein & Ebenstein

[57] ABSTRACT

A holder for a compact disc includes a tray adapted to releasably receive a compact disc thereon, and a base in telescopic relationship with the tray. The holder is movable from a spanning configuration wherein the base and tray are substantially untelescoped to a telescoped configuration wherein the base and tray are substantially overlying. The holder is used in an ecologically and economically desirable package which is switchable from an extended blank orientation, through an intermediate display orientation, to a collapsed home orientation. The package in the extended blank orientation has sections disposed in a common plane, in the collapsed home orientation has each of its sections substantially overlying with the holder disposed in the telescoped configuration, and in the intermediate display orientation has sections disposed in first and second planes with the holder disposed in an intermediate plane in the spanning configuration to preclude folding of the package into the collapsed home configuration prior to movement of the holder to the telescoped configuration.

51 Claims, 10 Drawing Sheets

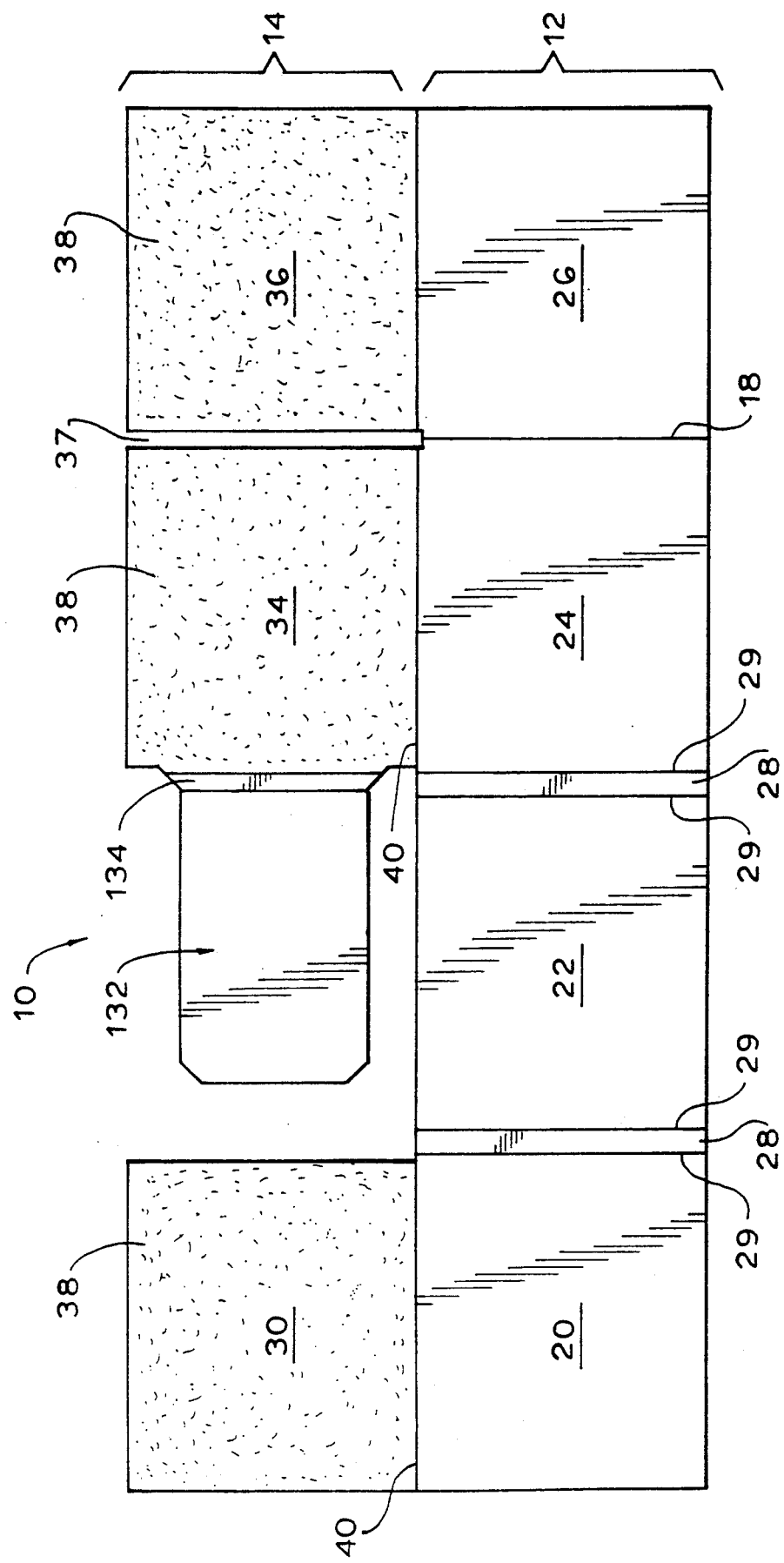

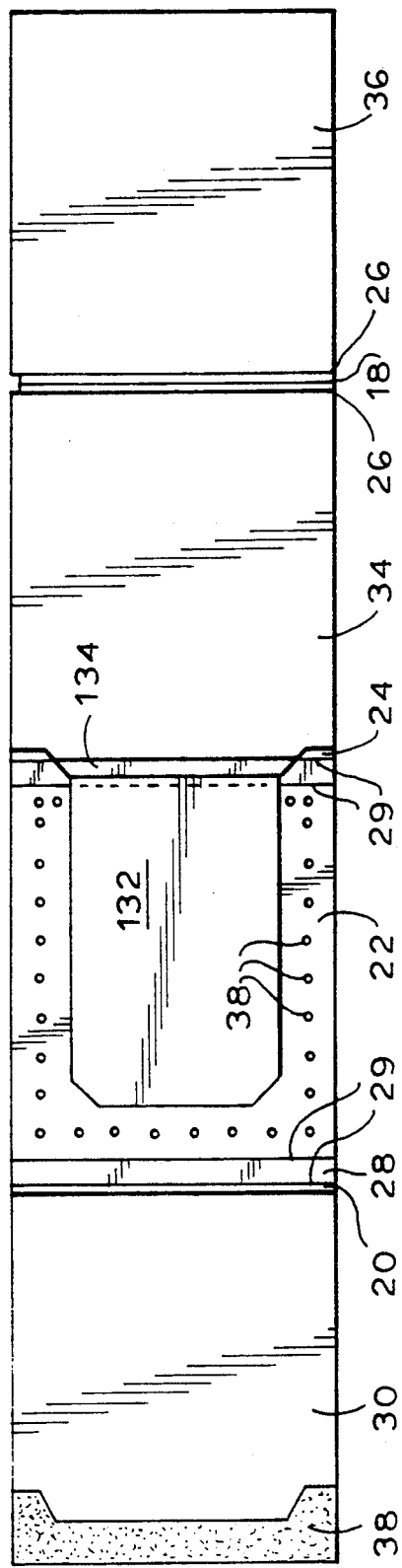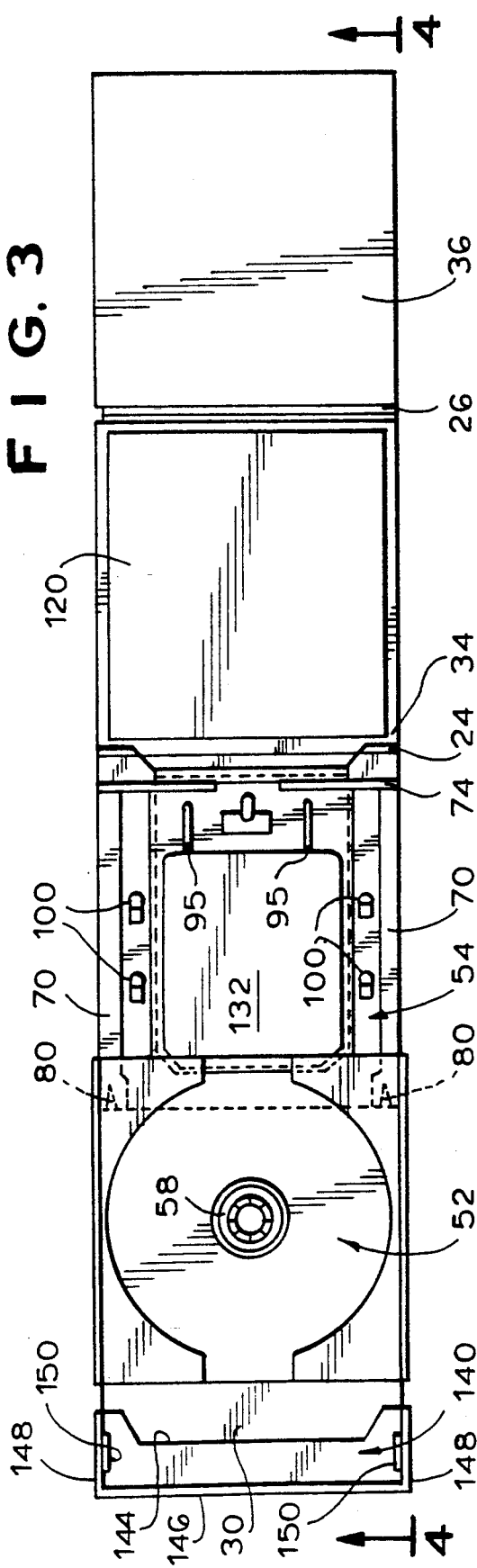

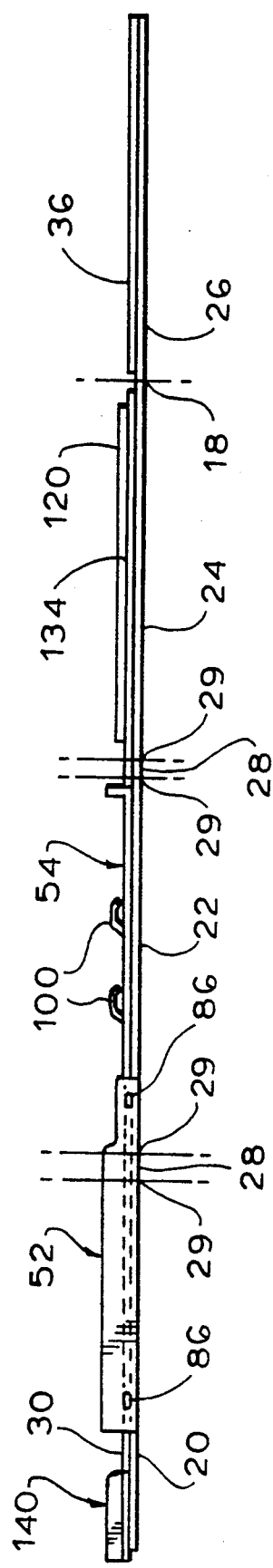
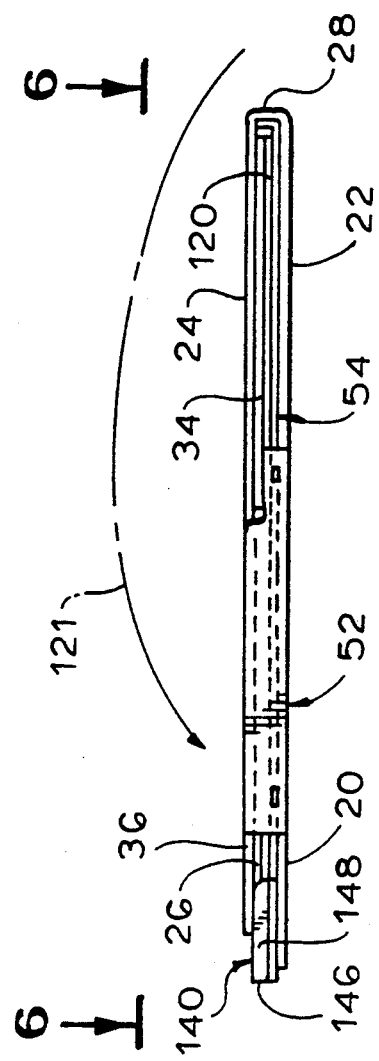

F I G. 6
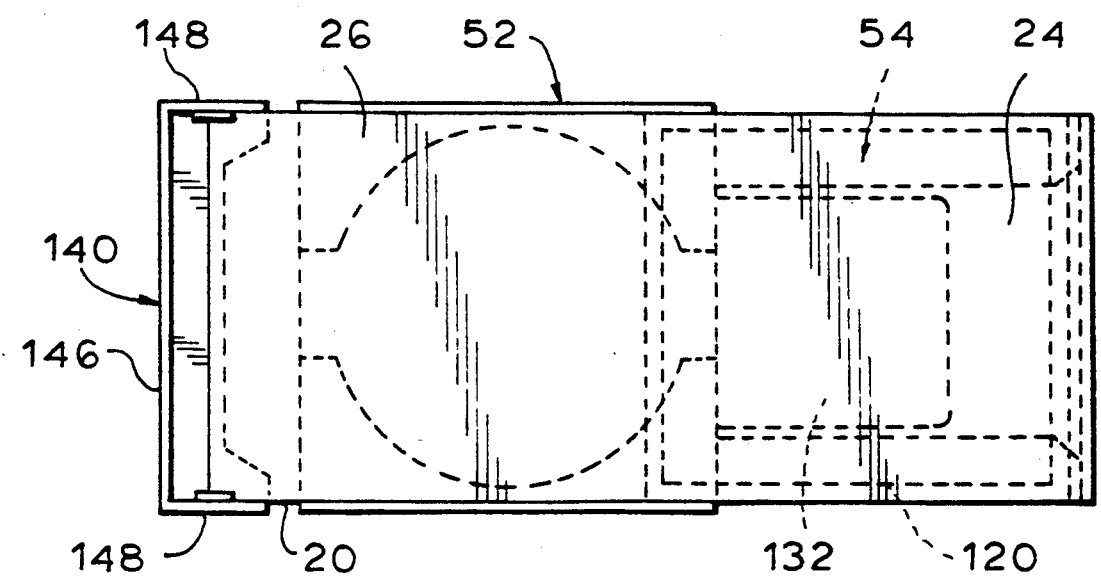
F I G. 10
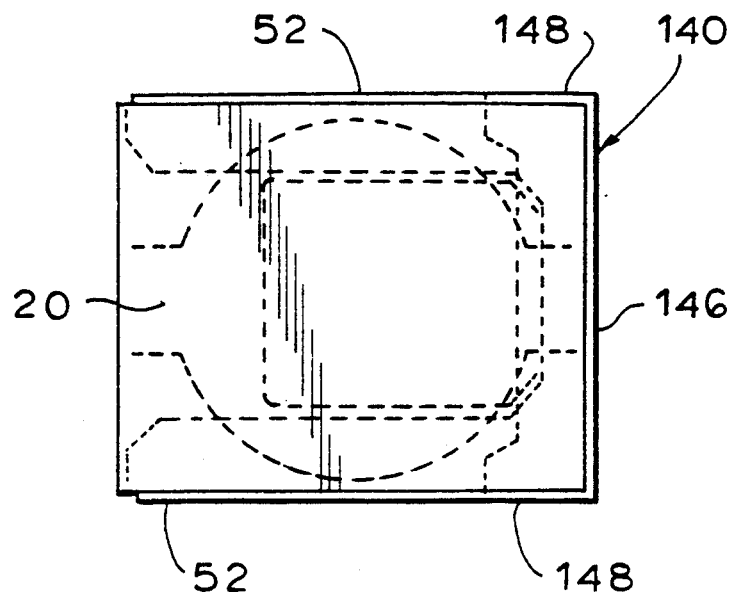

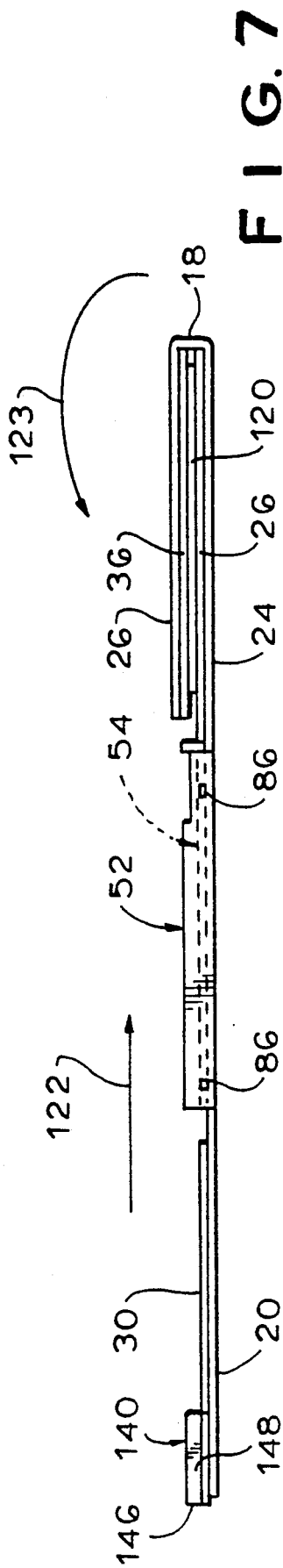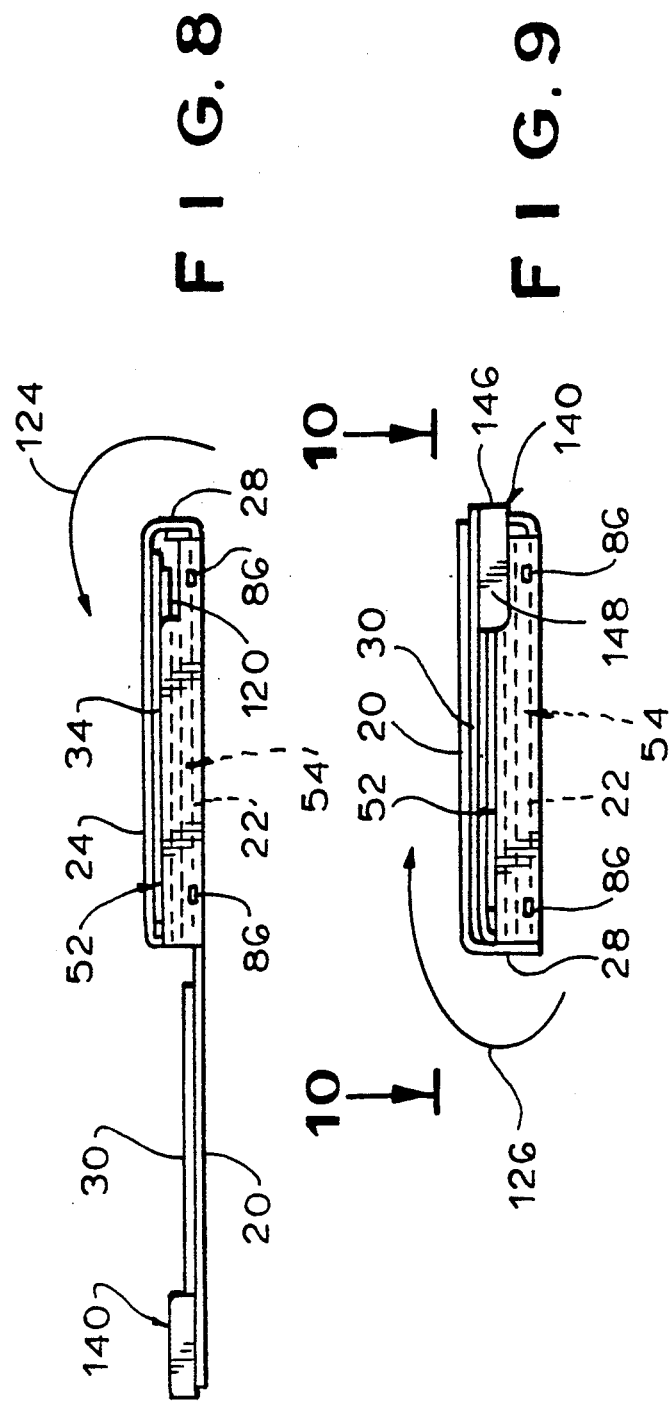

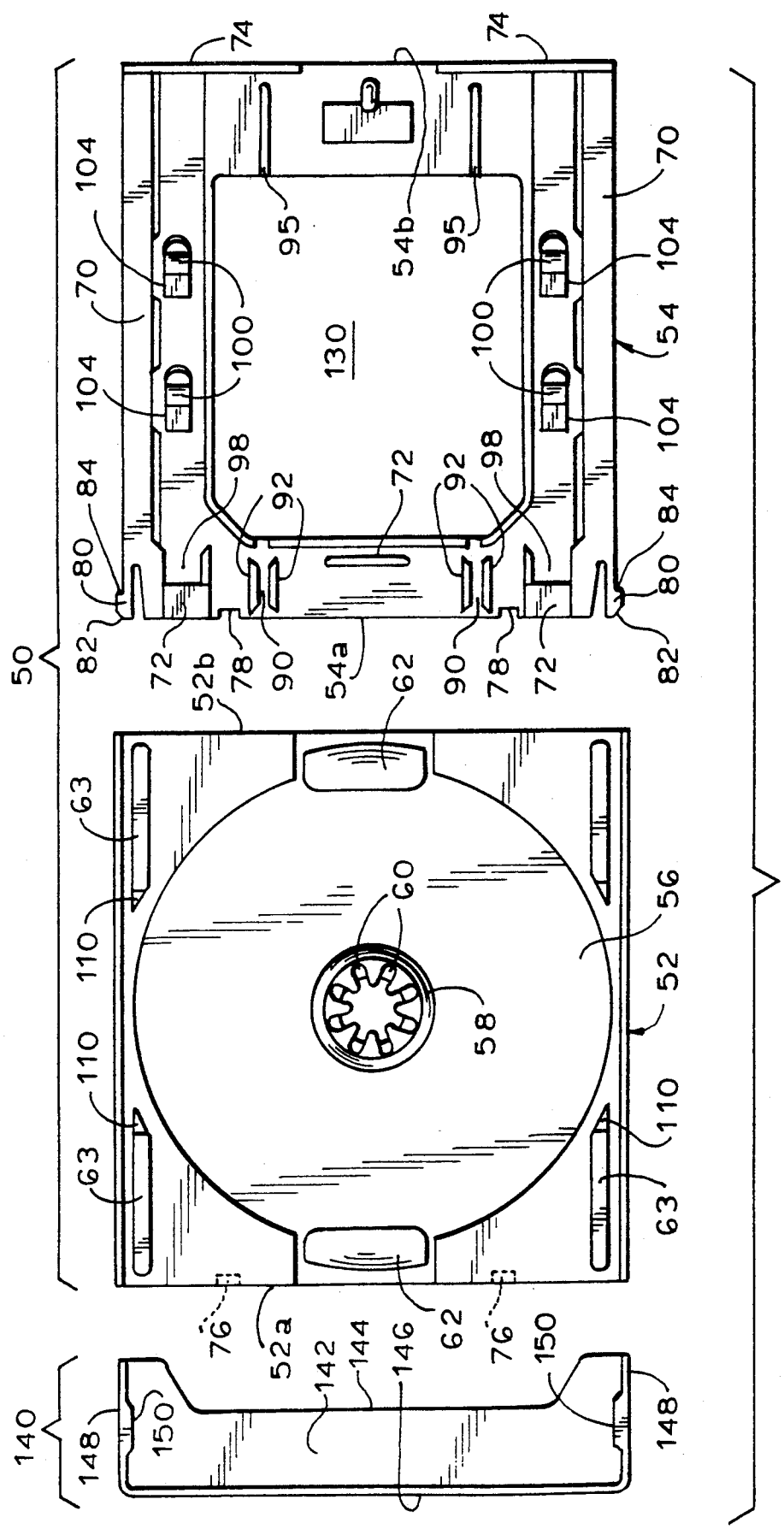

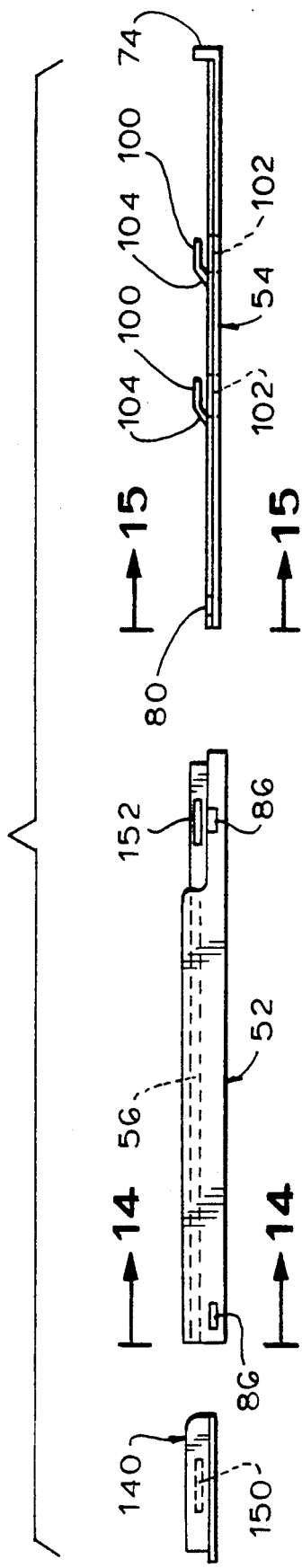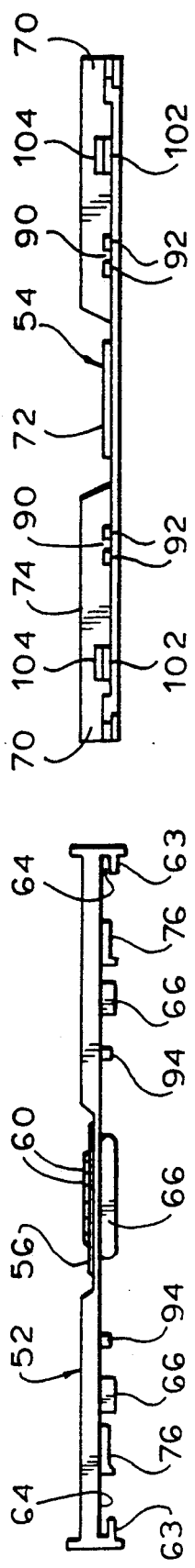

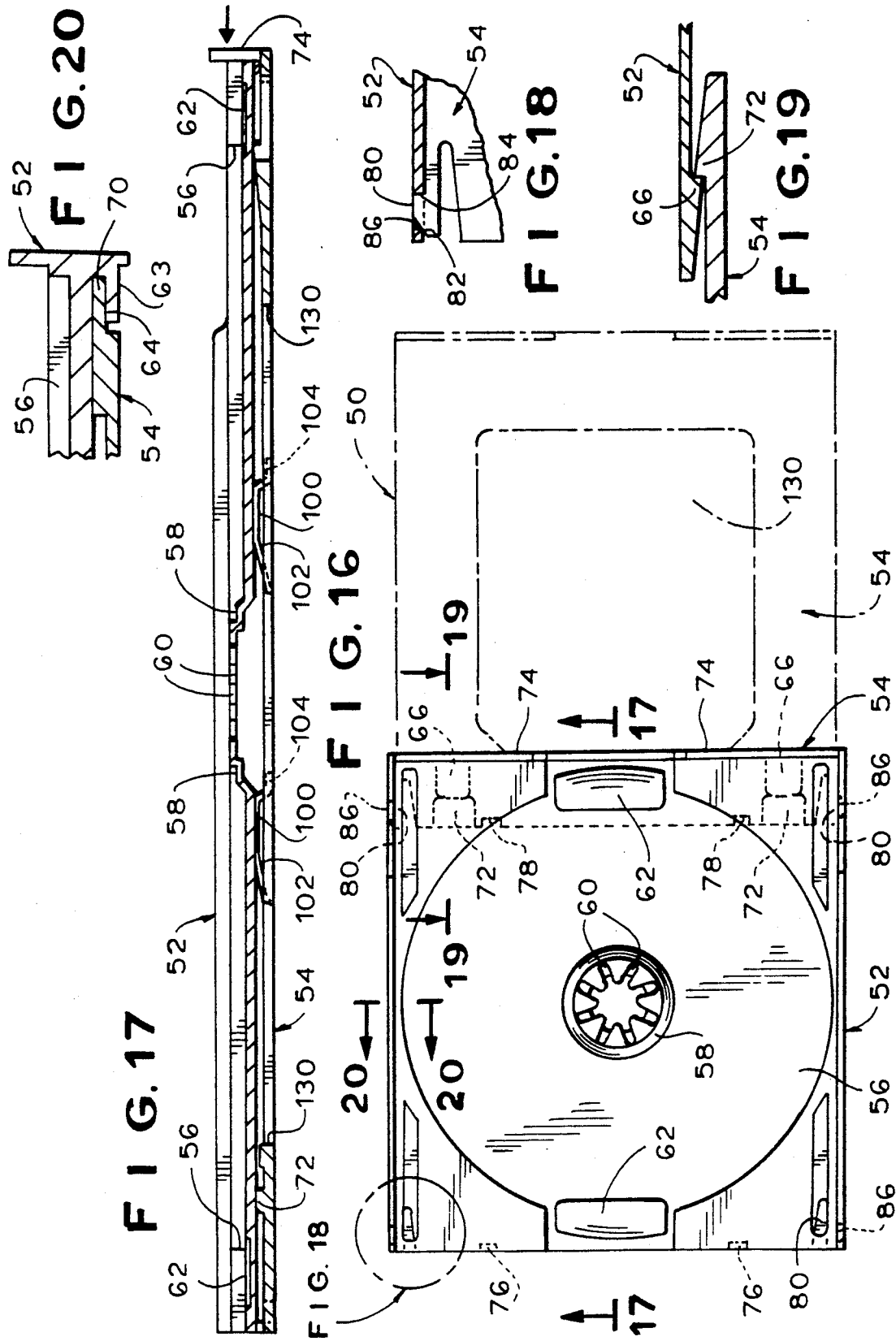

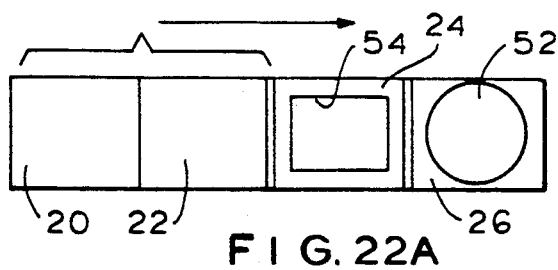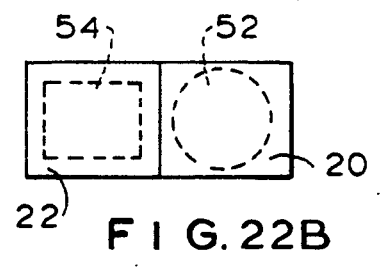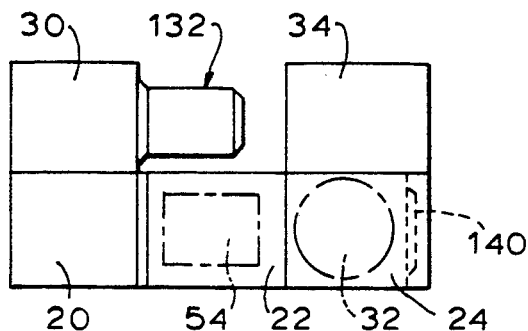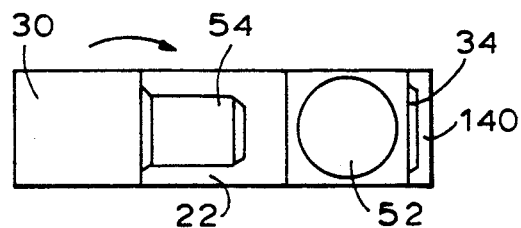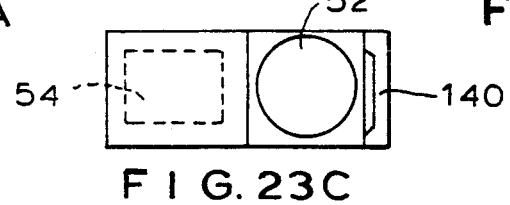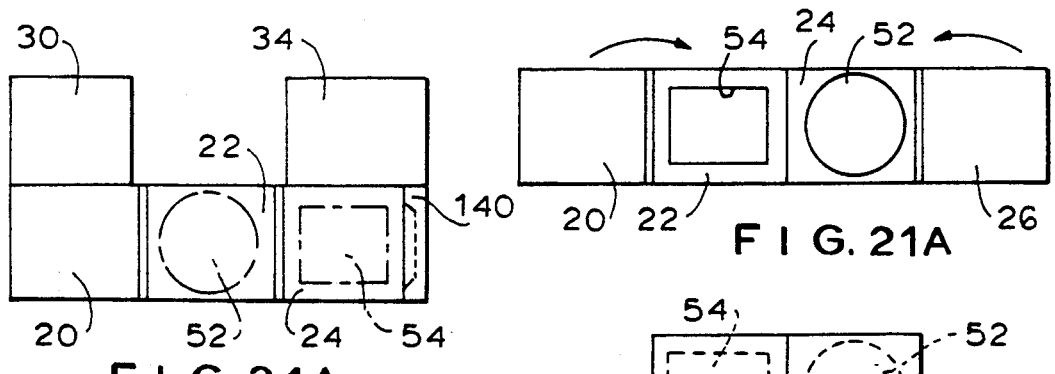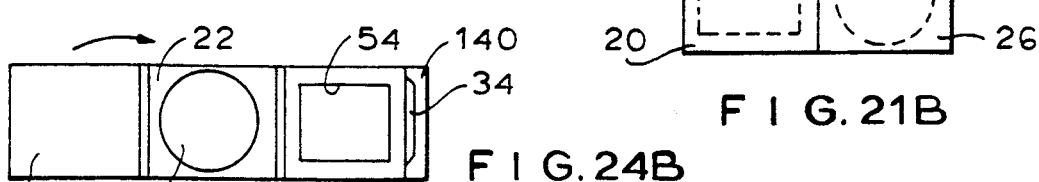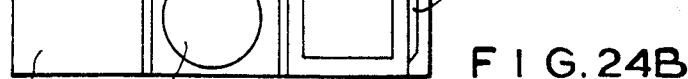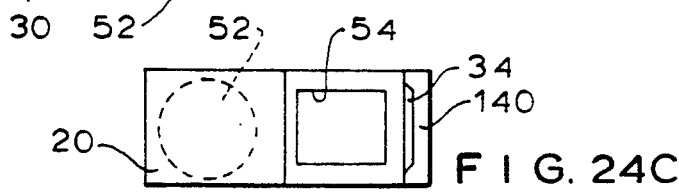

COMPACT DISC HOLDER AND PACKAGE THEREFOR

BACKGROUND OF THE INVENTION

The present invention relates to a holder for a compact disc and a package utilizing such a holder, and more particularly to such a holder and package which is environmentally acceptable, compactly storable by the user, and designed to discourage shoplifting thereof.

The compact disc or CD, a 4.7 inch diameter metallized plastic disc containing laser-readable information, has recently been a major force in the recorded music industry. It is also used (in one size or another) in the digital recording of data for information processing, interactive videodiscs and a variety of other non-musical applications. The CD has generally been packaged in a so-called "jewel box" formed of rigid plastic elements hingeably connected along one edge so as to open like a book. Although somewhat expensive to manufacture and assemble, the jewel box has become a standard in the industry because of its attractive appearance and the high level of protection it affords to the CD. The paperboard package in which the jewel box is displayed for sale and sold is frequently greatly oversized relative to the CD or jewel box (often having a length or width which is twice the diameter of the CD) in order to discourage shoplifting thereof by making it more difficult for the potential shoplifter to hide the package in pocket or purse. However, the jewel box has come under very strong attack by environmental groups because of its use of a non-biodegradable material (i.e., plastic) in great quantities due to the sheer volume of CD's being sold, and the paperboard packaging therefor has also come under attack because of its use of a valuable resource (i.e., paperboard) in great quantities due to the oversized nature of the packaging relative to the jewel box.

U.S. Pat. No. 4,709,812 illustrates an attempt to provide a CD package which, with the exception of a CD holder formed of plastic, is made exclusively of a biodegradable material (i.e., paperboard). The package is formed from a pre-scored, pre-printed unitary blank or sheet having two rows, each row having a like number of sections, with the rows being disposed so that the second row may be folded over the first row, with the overlying sections forming segments and the segments eventually being placed in an overlying configuration. The aforementioned package has not proven to be entirely satisfactory in use. In order to increase the effective size of the package so as to discourage shoplifting thereof, the package must be inserted into a larger carton, thereby increasing the cost of materials, the assembly cost, and again provoking environmental concerns because of the paperboard resource which is wasted when the carton is taken home, separated from the packaging, and discarded. Further, because a package made from a blank having two rows of three sections each has a thickness of six sections plus the thickness of the compact disc holder, the package is not as compact as the jewel box and may not fit into previously purchased storage boxes having a plurality of compartments, each compartment being adapted to hold an article having the thickness of only a jewel box.

It has been proposed to modify the above-described package by making it from a 2×4 section blank, so that the package will have four segments folded over to form two overlying layers (one behind the plane of the CD and one in front of it) and then temporarily rigidify this structure with rigid plastic strips removably affixed as longitudinal side pieces in order to provide a structure which is large enough to deter shoplifting thereof (due to the presence of the rigidifying plastic strips) and yet after purchase and discarding of the plastic strips, can be folded into approximate jewel box size. This proposal introduces its own problems, including the additional expense required to manufacture the plastic strips and assemble them onto the paperboard package, the environmental concerns raised by the plastic strips which must be discarded after purchase, and the like.

Accordingly, it is an object of the present invention to provide a CD package which is environmentally acceptable and yet of such a size as to deter shoplifting thereof.

Another object is to provide such a CD package including a novel CD holder which can be deployed to rigidify the package at a size sufficient to deter shoplifting thereof, yet can be collapsed after purchase in order to permit folding of the package to substantially the dimensions of a conventional jewel box.

Yet another object is to provide such a shrink-wrapped CD package wherein only the shrink wrapping must be disposed of after purchase.

A further object is to provide such a CD holder.

It is also an object of the present invention to provide such a CD package which is economical to manufacture, easy to assemble, and of rugged, sturdy construction.

SUMMARY OF THE INVENTION

It has now been found that the above and related objects of the present invention are obtained in a holder for a compact disc comprising a tray adapted to releasably receive a compact disc thereon, and a base in telescopic relationship with the tray. The holder is switchable between a telescoped configuration wherein the base and the tray are substantially overlaying and a spanning configuration wherein the base and the tray are substantially untelescoped.

In a preferred embodiment of the present invention, the base and the tray are disposed in a mutually slidable relationship permitting movement from the spanning configuration to the telescoped configuration. More particularly, one of the base and the tray defines a slideway, and the other of the base and the tray defines a slide which is slidably received within the slideway. The one of the base and the tray defining a slideway further defines at least one swipe aperture adjacent each slideway for enabling swipe molding of the one of the base and the tray with the slideway. Preferably means are provided to preclude unintended separation of the base and the tray by limiting relative untelescoping movement of the base and the tray beyond the spanning configuration. Means are also provided for locking the holder in the telescoped configuration, the locking means being automatically actuated by movement of the holder to the telescoped configuration. More particularly, the locking means comprises a pair of laterally biased detents disposed on one of the base and the tray and a first pair of side recesses in the other of the base and the tray configured and dimensioned to engagingly receive the detents. The other of the base and the tray additionally includes a second pair of side recesses configured and dimensioned to releasably receive the detents, the detents, when in the second pair of side recesses, assisting in maintaining the holder in the spanning configuration.

The holder preferably additionally includes spacing elements on the base movable between an elevated first position wherein the spacing elements preclude movement of the holder to the collapsed orientation and a depressed second position wherein the spacing elements do not preclude such movement, the spacing elements being biased towards the elevated first orientation and automatically assuming the depressed second position as the holder is forcibly moved to the collapsed orientation.

The base and the tray are each preferably exclusively plastic and generally rigid. Adhesive means are disposed on a surface of one of the base and the tray.

The present invention additionally encompasses a package for a compact disc comprising a sheet (preferably paperboard) defining a row having at least three rectangular sections separated from each other by foldlines. At least an adjacent two of the sections are separated from each other by a strip having a width small relative to the width of the sections, the strip being bound by foldlines. The width of the sections and the strip are predetermined so that, when the sections are folded along the foldlines, the sections overlie each other. At least one compact disc holder is adhered to a respective one of the sections. The package is switchable from an extended blank orientation, through an intermediate display orientation, to a collapsed home orientation. The package in the blank orientation has the sections disposed in a common plane. The package in the collapsed home orientation has each of the sections substantially overlying, with the holder disposed in the telescoped configuration wherein the base and the tray are substantially overlying. The package in the intermediate display orientation has at least an adjacent pair of the sections, including the respective one section and separated by the strip, disposed in a first plane, and at least another of the sections disposed in a second plane at least partially overlying the tray. The holder is disposed in an intermediate plane in the spanning configuration wherein the base and the tray are substantially untelescoped and extend fully across the strip intermediate the pair of sections to preclude folding of the package into the collapsed home configuration prior to movement of the holder to the telescoped configuration.

In a preferred embodiment, the row has at least four rectangular sections separated from each other by foldlines, and the package in the intermediate display orientation has at least another adjacent pair of the sections disposed in the second plane at least partially overlying the tray and the base. The another adjacent pair of the sections disposed in the second plane is separated by another of the strips, and the holder in the spanning configuration extends fully across the strips intermediate each of the adjacent pairs of sections.

Preferably there are spacing elements on the base movable between an elevated first position, wherein the spacing elements preclude movement of the holder to the collapsed orientation and assist in preventing inward bowing of the sections in the second plane when the package is in the intermediate display orientation, and a depressed second position, wherein the spacing elements do not preclude such movement. The spacing elements are biased towards the elevated first position and automatically assume the depressed second position as the holder is forcibly moved to the collapsed orientation.

The package preferably additionally includes means for releasably maintaining the package in the collapsed home orientation. The means for releasably maintaining the package in the collapsed home orientation comprises a cap (preferably formed of plastic) secured to a section at one end of the row. In the intermediate display orientation the cap is disposed intermediate and spacing apart a pair of overlying sections, and in the collapsed home orientation the cap releasably engages the holder to maintain the package in the collapsed home orientation. The holder is secured to a section adjacent that section at one end of the row.

In the collapsed home orientation, the section at the one end of the row is folded over once and the section at the opposite end of the row is folded over twice. In the intermediate display orientation, an end pair of sections at one end of the row is folded over an end pair of sections at the other end of the row. Alternatively, the sections at each end of the row in the extended blank orientation are folded over at least once to form the intermediate display orientation.

The package may additionally include a cap adhered to the one of the sections over which the movable one of the base and the tray extends in the intermediate display orientation, the cap being of a thickness comparable to the movable one of the base and the tray to maintain the first and second planes parallel in the intermediate display orientation. The cap may include an opposed pair of means for releasably engaging the holder (and typically the tray thereof) to lock the package in the collapsed home orientation, the cap being disposed adjacent the free end of one of the end sections of the row and the locking means being disposed along the top and bottom of the one end section of the row.

The package preferably additionally includes means for releasably locking the package in the collapsed home orientation, the locking means being automatically actuated to releasably lock the package in the collapsed home orientation when the package is placed in the collapsed home orientation. The locking means is adhered to the one of the end sections over which the movable one of the base and the tray extends in the intermediate display orientation and releasably engages the tray when the package is in the collapsed home orientation.

In a preferred embodiment of the package, the sheet is divided into at least a first row and a second row, each row having a plurality of rectangular sections and the first row having a greater number of the sections than the second row. The rows are separated by a longitudinal foldline, the sections in the first row being separated from each other by transverse foldlines. At least an adjacent two of the sections are separated from each other by a strip having a width small relative to the width of the sections, the strip being bound by the transverse foldlines. The sections in the second row are separated from each other by slots, at least one of the sections of the second row being folded along the longitudinal foldline so that each of the thus folded sections of the second row partially overlies a respective section of the first row but does not overlie any of the transverse foldlines adjacent that section of the first row. The overlying sections are joined together to form segments, but at least one section of the first row does not have an overlying section from the second row. The width of the sections in the first row, of the strips and of the slots are predetermined so that when the sections are folded along the transverse foldlines the sections overlie each other. At least one compact disc holder is adhered to a respective one of the non-overlaid sections of the first row. In the intermediate display orientation, the package has at least an adjacent pair of the sections of the first row, including one of the non-overlaid sections and separated by the strip, disposed in a first plane, and at least an adjacent pair of the sections of the first row disposed in a second plane overlying the first plane. The holder is disposed in an intermediate plane in the spanning configuration wherein the base and the tray are substantially untelescoped and extend fully across the strip intermediate at least one of the adjacent pairs of sections of the first row to preclude folding of the package into the collapsed home configuration prior to movement of the holder to the telescoped configuration.

Preferably, the sheet is coated on only one side, the segments having coated outer surfaces and the surface of the at least one non-overlaid section of the first row to which the at least one compact disc holder is adhered being uncoated. The base defines a central aperture, and the second row additionally includes a cut-back panel smaller than a section and secured to one of the sections thereof by a transverse foldline. The cut-back panel is configured and dimensioned to only partially overlap the non-overlaid section of the first row, with a substantial portion of the cut-back panel visible through the central aperture of the base and without impeding direct adherence of the holder to the non-overlaid section of the first row. The cut-back panel is disposed essentially intermediate the slideways securing the holder to the non-overlaid section of the first row.

BRIEF DESCRIPTION OF THE DRAWING

The above and related objects and features of the present invention will be more fully understood with reference to the following description of the presently preferred, albeit illustrative, embodiments of the present invention when taken in conjunction with the accompanying drawing wherein:

FIG. 1 is a top plan view of a blank from which the paperboard portion of the package of the present invention is formed;

FIG. 2 is a top plan view of the blank folded along a longitudinal foldline;

FIG. 3 is a top plan view of the package in its extended blank orientation;

FIG. 4 is a side elevational view thereof, taken along the line 4—4 of FIG. 3;

FIG. 5 is a side elevational view of the package in its intermediate display orientation;

FIG. 6 is a top plan view thereof, taken along the line 6—6 of FIG. 5;

FIGS. 7, 8 and 9 are schematic side elevational views showing the folding of the package from its extended blank orientation (FIG. 7) to its collapsed home orientation (FIG. 9);

FIG. 10 is a top plan view of the package taken along the line 10—10 of FIG. 9;

FIGS. 11, 12 and 13 are exploded top plan, bottom plan and side elevational views, respectively, of the plastic components of the packaging;

FIGS. 14 and 15 are end elevational views thereof, taken along the lines 14—14 and 15—15 of FIG. 13, respectively;

FIG. 16 is a top plan view of the CD holder in its telescoped configuration, with the base in the spanning configuration being indicated in phantom line;

FIG. 17 is a sectional view to an enlarged scale taken along the line 17—17 of FIG. 16;

FIG. 18 is a sectional view to an enlarged scale of the area indicated by the phantom line circle designated FIG. 18 in FIG. 16;

FIG. 19 is a fragmentary sectional view to an enlarged scale, taken along the line 19—19 of FIG. 16;

FIG. 20 is a fragmentary sectional view to an enlarged scale, taken along the line 20—20 of FIG. 16;

FIGS. 21A and 21B are schematic top plan views of a package according to the present invention made from a blank having a 1×4 configuration, in the extended blank orientation and in the intermediate display orientation, respectively;

FIG. 22A and 22B are schematic top plan views of a package according to the present invention also made from a blank having a 1×4 configuration, in the extended blank orientation and in the intermediate display orientation, respectively;

FIGS. 23A, 23B and 23C are schematic top plan views of a package according to the present invention made from a blank having a 2×3 configuration, in the unfolded sheet orientation (with the future positions of the tray, base and cap being illustrated in phantom line), in the extended blank orientation, and in the intermediate display orientation, respectively; and FIGS. 24A, 24B and 24C are schematic top plan views of a package according to the present invention also made from a blank having a 2×3 configuration, in the unfolded sheet orientation (with the future positions of the tray, base and cap being illustrated in phantom line), in the extended blank orientation and in the intermediate display orientation, respectively.

DETAILED DESCRIPTION OF PREFERRED EMBODIMENTS

Figure 12:
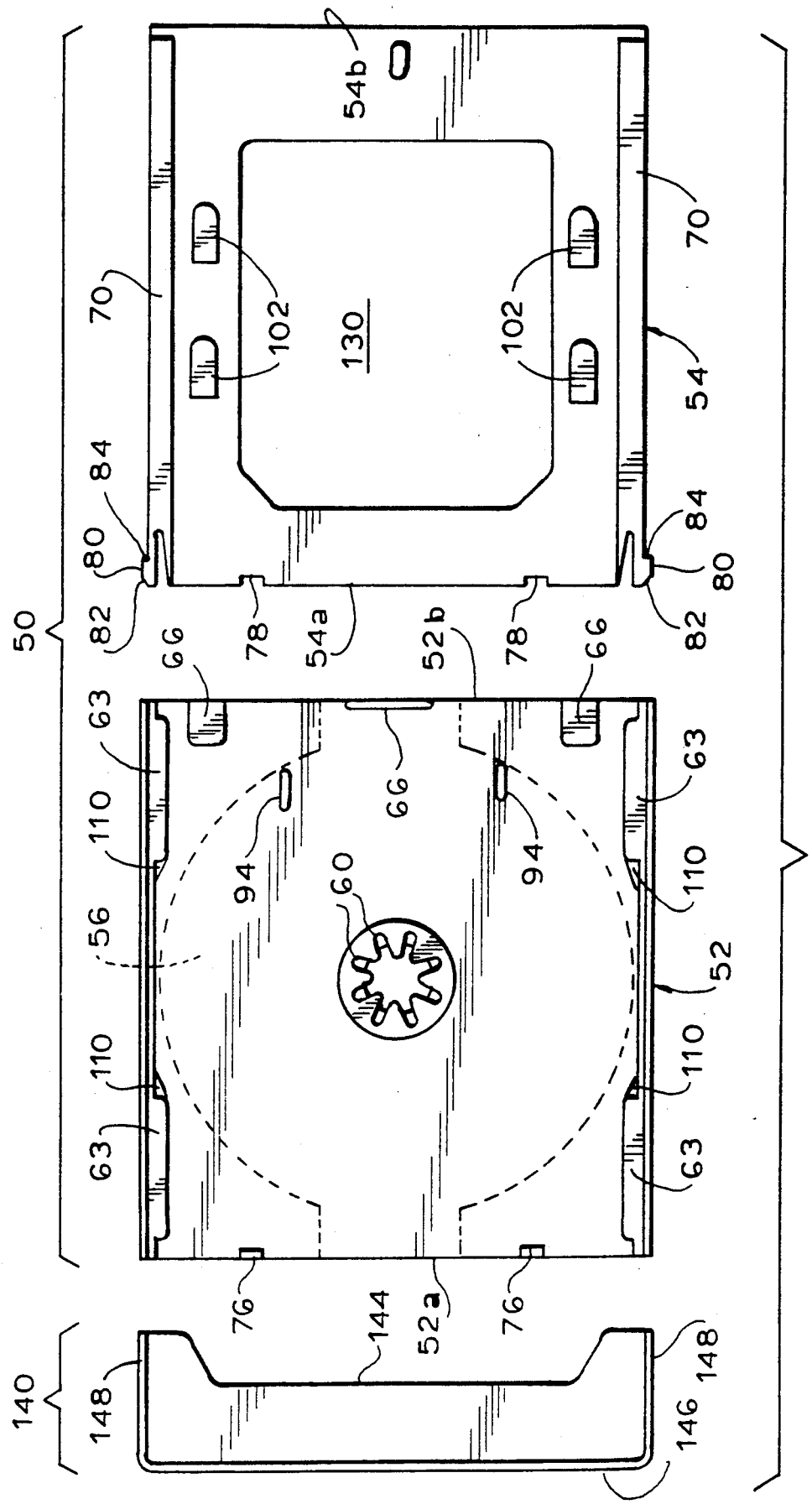

Referring now to the drawing and in particular to FIG. 1 thereof, therein illustrated is a blank 10 for use in the present invention. The blank 10 in its unfolded state comprises a rectangular sheet of paperboard, cardboard or the like divided into a plurality of rows, including a first row generally designated 12, a second row generally designated 14 to one side of the first row 12 (here illustrated as above the first row 12), and optionally an additional row (not shown) disposed on the other side of the first row 12.

The first row 12 is divided into a plurality of at least three, and preferably at least four, generally rectangular sections 20, 22, 24, 26, separated from each other laterally either by transverse foldlines 18 (see intermediate sections 24, 26) or by relatively thin strips 28, each strip 28 in turn being bounded laterally by transverse foldlines 29 (see intermediate sections 20, 22 and 22, 24). The number of foldlines 18 (here, 1) and strips 28 (here, 2) combined (here, 3) is one less than the number of sections (here, 4) in the first row 12. The second row 14 preferably contains a fewer number of generally rectangular sections than the first row 12, three sections 30, 34 and 36 being illustrated for expository purposes. The sections of the second row 14 are separated from each other by slots 37 having a width which is at least slightly greater than the width of the foldlines 18 or strips 28 aligned therewith (see intermediate sections 32, 34) and, in the case of non-consecutive sections in the second row 14, which is greater than the width of a single section 20, 22, 24, 26 of the first row 12 and any of its bordering foldlines 18 or strips 28 (see intermediate sections 30, 32).

The sections 30, 34, 36 of second row 14 are separated from the aligned sections 20, 244, 26 of the first row 12 by a longitudinal foldline 40 so that at least one of sections 30, 34, 36 of the second row 14 may be folded along the foldline 40 so that each of the thus-folded sections 30, 34, 36 of the second row 14 partially overlies a respective section 20, 24, 26 of the first row 12, but does not overlie any foldlines 18 or strips 28 adjacent that section of the first row 12. The slots 37 are wider than the foldlines 18 or strips 28, as appropriate, so that when the sections of the second row 14 are folded over the sections of the first row 12 they do not extend across the adjacent foldlines 18 or the adjacent strips 28 (including foldlines 29). During assembly of the package into the form shown in FIG. 2, sections 30, 34, 36 of the second row 14 are folded over along foldline 40 on top of aligned sections 20, 24, 26 of the first row 12 and glued down to the latter sections to form segments (defined by one section of the first row 12, one section of the second row 14, and adhesive means 38 indicated in FIG. 1 by speckling therebetween).

After, during or before the aforementioned folding and gluing operation, a CD holder according to the present invention, generally designated 50, is glued or otherwise affixed to the face of one of the sections 20, 22, 24, 26 of the first row 12 which is not and will not be overlaid by and glued to one of the sections 30, 34, 36 of the second row 14. Thus, the CD holder 50 may be glued to section 22 in the embodiment illustrated in FIG. 1.

Referring now in particular to FIGS. 11 and 12, therein illustrated is a holder 50 for a CD. Holder 50 comprises a generally planar tray generally designated 52 adapted to releasably receive a CD thereon and a generally planar base generally designated 54 in telescopic relationship with the tray. The front face of tray 52 is similar to the front face of a conventional CD holder. Thus the tray is approximately 4.9 inches long by 5.5 inches wide for a standard CD (approximately 4.7 inches in outer diameter). The front face of the tray 52 defines a recess 56 which is adapted to receive therewithin a CD, with the upper surface of the CD preferably flush with or below the upper surface of tray 52 to protect the CD. The circumference of the recess 52 is slightly greater than the circumference of the CD to facilitate receipt of the CD within the recess 52.

An upstanding element 58 in the center of the recess 52 extends through the central hole in the CD (approximately 0.6 inches in diameter) and provides a means for releasably retaining the CD on the tray 52 against accidental displacement. Any of the conventional means for providing frictional engagement between element 58 and the circumference of the central hole of the CD can be used. Typically the element 48 comprises a plurality of upstanding pliable plastic tabs 60, such as those used in the conventional jewel box, the tabs 60 frictionally engaging the circumference of the central hole of the CD and holding it in place. The front face of the tray 52 is also provided with one or more finger slots 62 (two diametrically opposed finger slots being illustrated) so that the user can slide a finger under the edge of the CD while simultaneously exerting a slightly inward and downward force with his thumb on the upstanding tabs 60 to slide the upstanding tabs 60 toward the center of the CD tray 52, thus permitting the user to easily disengage the CD from element 58.

While the front or top face of the tray 52 is conventional in appearance, the rear or bottom face of the tray 52 is not. Referring in particular to FIGS. 12, 14 and 16, the rear face of the tray 52 has an opposed pair of sides defining at least a pair of inwardly extending flanges 63 defining slideways or slots 64 disposed along the length of the tray 52 and adapted to receive thin slides or rails 70 provided on the base 64, as described hereinafter. One end 52a of the rear face of the tray 52 (the left end as shown in FIGS. 11 and 12) connecting the opposed sides defining slots 64 defines a plurality of raised stops 66 (see FIG. 12) adapted to engage raised stops 72 (see FIG. 11) on the base 54 to prevent disengagement of the tray 52 from the base 54 in one direction, as will be explained hereinafter.

The base 54 of holder 50 has an opposed pair of sides defining thin slides or rails 70 configured and dimensioned to be received within the slideways or slots 64 of tray 52, as best illustrated in FIGS. 16 and 20. One end 54a of the front face of the base 54 (the left end as shown in FIGS. 11 and 12), connecting the opposed sides defining rails 70, defines a plurality of raised stops 72 (see FIG. 11) adapted to releasably engage the raised stops 66 (see FIG. 12) of tray 52 to prevent disengagement of the slots 64 of tray 52 and the rails 70 of base 54 in one direction, as best illustrated in FIGS. 16 and 19. The raised stops 66 and 72 engage to limit untelescoping action of the holder 50, thereby preventing accidental separation of the tray 52 and base 54 in that direction. The opposite end 54b of the front face of the base 54 (the right end as shown in FIGS. 11 and 12) defines a raised structure 74 adapted to releasably engage the opposite end 54a of the tray 52 (the right end as shown in FIGS. 11 and 12) to prevent disengagement of the slots 64 of tray 52 and the rails 70 of base 54 in the other direction, thereby to provide a positive limit to the telescoping action and thereby prevent the same from becoming untelescoping action in the opposite direction, as best illustrated in FIG. 17. To the same end, the one end 52a of the front face of the tray 52 (the left end as shown in FIGS. 11 and 12) defines a plurality of raised stops 76 adapted to releasably engage recesses 78 disposed on the one end 54a of the base 54 (the left end as shown in FIGS. 11 and 12) to prevent disengagement of the slots 64 of tray 52 and the rails 70 of base 54 in the opposite direction (that is, also to limit the telescopic action before it becomes untelescoping action), as also best illustrated in FIG. 17.

Accordingly, it will be appreciated that the tray 52 and base 54 are disposed in a mutually slidable relationship permitting switching between a telescoped configuration (see FIGS. 7-10 and 17), wherein the base and the tray are substantially overlying, and a spanning configuration (see FIGS. 3-5 and 16), wherein the base and the tray are substantially untelescoped. The abutting interaction of the raised stops 66, 72 limits the motion of the tray 52 relative to the base 54 in one direction as the tray 52 and base 54 are moved into the spanning configuration, and the abutting interaction of the end 52b and the raised stops 76 of the tray 52 with the raised structure 74 and recesses 78 of the base 54, respectively, limits motion of the tray 52 relative to the base 54 in the opposite direction, as they are moved into the telescoped configuration, thereby to preclude unintended separation of the base and the tray. Thus the holder 50 defines means precluding unintended separation of the base and the tray by limiting relative movement thereof within a plane —namely, the plane defined by the slots 64 and rails 70.

While the drawing discloses the tray 52 as having inwardly open slots 64 and the base 54 as having outwardly extending rails 70, alternatively the slots 64 may be outwardly open or disposed upon the base 54 and the rails 70 may be inwardly extending or disposed on the tray 52, without interfering with the function of the holder 50. Similarly, in an alternative embodiment, the raised stops 66 may be disposed upon the base 54 and the raised stops 72 may be disposed upon tray 52, without interfering with the function of the holder 50, etc.

In the preferred embodiment of the invention illustrated, the base 54 additionally includes a pair of outwardly biased side locks 80 disposed at one end 54a (the left end as illustrated in FIGS. 11 and 12). Each side lock 80 is generally aligned with a rail 70 and has a beveled edge 82 adjacent the forward end and an unbeveled edge 84 adjacent the rear. Referring now in particular to FIGS. 16 and 18, the base 52 defines along each side thereof a pair of longitudinally spaced side apertures 86, each side aperture 86 being adapted to receive a side lock 80. The side apertures 86 are disposed so that one side aperture 86 on each side of the tray 52 is disposed adjacent the trailing end 52b of the tray 52 (the right end, as illustrated in FIG. 16) and one side aperture 86 on each side is disposed adjacent the forward end 52a (the left end, as illustrated in FIG. 16) of the tray 52. When the holder 50 is in the spanning configuration, with stops 66 of tray 52 and stops 72 of base 54 abutting, the side locks 80 are disposed within the side apertures 86 adjacent the trailing end 52b of the tray 52 and act to releasably maintain the holder 50 in the spanning configuration. On the other hand, when the holder 50 is in the telescoped configuration, the side locks 80 are disposed within the side apertures 86 adjacent the forward 52a end of the tray 52. It will be appreciated that while the beveled forward edge 82 of each side lock 80 will cam inwardly easily to permit movement of the holder 50 from the spanning configuration to the telescoped configuration, the unbeveled trailing edge 84 of each side lock 80, through its abutment with the side apertures 86 adjacent the leading end 52a, precludes movement of the holder 50 from the telescoped configuration to the spanning configuration.

While the side locks 80 and side apertures 86 provide a convenient and elegant means for temporarily retaining the holder 50 in its spanning configuration and subsequently locking the holder in the telescoped configuration, other means may be employed instead of, or in addition to, the same to achieve the same purposes. Thus, a pair of raised stops may be provided to releasably engage one another when the holder is in the spanning configuration and another pair of raised stops may be provided to lockingly engage one another when the holder is in the telescoped configuration.

Referring now to FIGS. 11 and 12, additional means are preferably provided in order to stabilize the holder 50 in the spanning configuration so that the tray 52 and holder 54 cannot wobble relatively from side to side. The upper surface of the leading end 54a of the base 54 defines a pair of channels or guideways 90, each channel 90 being defined by a raised pair of flanges 92 (see FIG. 11), and the lower surface of the trailing end 52b of the tray 52 defines a pair of guides 94 adapted to be snugly received in the channels 90 when the holder 50 is in the telescoped configuration. The snug fit of the guides 94 intermediate the channel-defining flanges 92 provides additional lateral stability for the holder 50 without impairing its ability to move from the spanning configuration to the telescoped configuration. It will, of course, be understood, that in an alternative embodiment, the channels 90 may be disposed on the tray 52 and the guides 94 on the base 54.

A pair of longitudinally-extending recesses 95 is disposed on the upper surface on the base 54 adjacent its trailing edge 54b containing raised stops 74, these recesses 95 being aligned with the longitudinally-extending channels 90 at the leading end 54a of the base 54 and being adapted to snugly receive the guides 94 of tray 52 when the holder 50 is in the telescoped configuration. The upper surface of the leading end 54b of the base 54 defines channels 98 adjacent the raised stops 72, the channels 98 being adapted to snugly receive the raised stops 66 of the tray 52 when the holder is in the spanning configuration, thereby to further preclude lateral wobbling movement of the tray 52 relative to the base 54.

For reasons which will become apparent hereinafter, each of the opposed sides of the base 54 preferably defines inwardly of the rails 70 at least one upwardly biased resilient spacing element or spacer 100 (and preferably a longitudinally spaced pair of them) and a cut-out portion 102 disposed immediately below each spacer 100. Each spacer 100 is secured to the upper surface of base 54 at its leading end (that is, to the left as shown in FIGS. 11 and 12) by a living hinge, with the leading portion thereof 104 being beveled so that, as the holder 50 is being moved to its telescoped configuration, the trailing end 52b of the tray 52 will cam the beveled portions 104 of spacers 102 downwardly into the main plane of the base 54 to enable the holder 50 to assume the telescoped configuration. Alternatively, but for the same purpose, there may be provided spacers (not shown) secured to the base 54 by living hinges extending longitudinally along a side thereof, the leading edge of each spacer being beveled. These spacers extend generally perpendicular to the base 54 when the holder 50 is in the extended configuration, but are automatically camed parallel to the base 54 as the holder moves to its telescoped configuration.

The tray 52 and base 54 are preferably formed exclusively of plastic, especially a rigid or semi-rigid plastic such as high heat impact polystyrene, and may conveniently be injection molded either as separate elements or as a single element connected by bridges which may be broken in order to separate the base and tray. While the inwardly extending flanges 63 needed to define the slots 64 of tray 52 may be formed using a cam mold (whereby a mold member is disposed intermediate each flange 63 and the main plane of the tray 52 during molding and then withdrawn to leave a slot 64 available for the eventual receipt of the rails 70 of the base 54), it is easier and substantially cheaper to provide lock-out (also known as "swipe") apertures such as the top lock-out apertures 110 extending through the main plane of the tray 52 above flanges 63 so that the flanges 63 (and hence slots 64) may be formed by the well known process of side-lock-out molding, which enables the slots 64 to be formed in a substantially cheaper mold than would be required for cam molding. The top lock-out apertures 110 are at least co-extensive with and preferably greater in area than the slots 64 to be formed thereunder. Alternatively, side lock-out apertures (not shown) may be provided for the same purpose, the side lock-out aperture extending through the transverse sidewalls of the tray 52 adjacent the flanges 63.

It is customary to include in a CD package a relatively thin booklet 120 identifying or commenting on the contents of the CD, its artists or the like. According to the present invention, the booklet 120 is conveniently glued or otherwise secured (either releasably or permanently) to one of the sections not covered by the base 54 or tray 52 in the spanning configuration. As illustrated in FIG. 3, the booklet 120 is secured to the upper surface of section 34 of the second row 14. Where the booklet 120 is to be permanently secured to the paperboard packaging, section 34 of the second row 14 may be dispensed with and the booklet 120 secured directly to section 24 of the first row 12, thereby to enable a reduction in the total thickness of the package in its collapsed home orientation. As the paperboard used in the package of the present invention is typically coated and optionally multi-color printed on only one surface—namely, the hidden bottom surface in FIG. 1— dispensing with section 34 would cause the package in its extended blank orientation to display an "unfinished" surface—namely, the upper surface of section 24—but this is of little import if that section 24 would be permanently substantially covered by booklet 120 and it is desirable to reduce the total thickness of the package in its collapsed home orientation. In an alternative embodiment, the booklet 120 may be disposed on section 36 rather than section 34 or, if section 36 is dispensed with, directly on section 26. Depending upon the thickness of the booklet 120, in order to permit easy folding of the package, foldline 18 intermediate sections 24, 26 of the first row 12 may be replaced by a strip 28 and its associated foldlines 29 on either side thereof.

From the extended blank orientation illustrated in FIGS. 3-4, the package is folded along the foldlines 29 bordering strip 28 intermediate section 22 and section 24 to assume the intermediate display orientation illustrated in FIG. 5 (the right half of the packaging being turned in the direction of arrow 121 over the left half). The result is a generally parallelopiped configuration which, when overwrapped in conventional fashion with a heat-shrunk outerwrap (not shown), is relatively rigid and resists folding into a more compact configuration until the overwrap is removed, the package unfolded, and the holder moved to the telescoped configuration. It will be appreciated that the natural resistance of the paperboard to compression, supplemented by the rigidity imparted thereto by a tightly heat-shrunk overwrapping, strongly resists any forcible attempt to move the holder 50 to its telescoped configuration prior to opening of the package. Folding of the package in half along foldlines 29 is prevented by the presence therein of the holder 50 in its spanning configuration, as illustrated in FIG. 5.

Referring now to FIG. 5, it will be appreciated that when the package is in the intermediate display orientation illustrated, the spacers 100 (not visible in FIG. 5) upstanding from the base 54 by their resiliency resist inward bowing of the overlying sections 24, 34 and any booklet 120 and thereby assist in maintaining the package in a convenient and attractive parallelopiped configuration. Depending upon the thickness of booklet 120, the spacing elements 100 will retreat as necessary into the cutouts 102.

On the other hand, as illustrated in FIG. 7, once the package has been purchased and the overwrap removed, the package may be returned generally to the extended blank orientation illustrated in FIG. 9, and then the tray 52 moved in the direction of arrow 122 in order to cause the holder 50 to assume its telescoped configuration. The right segment comprised of sections 26, 36 is next folded in the direction of arrow 123 about foldline 18 to cover the booklet 120 and the segment comprised of sections 24, 34. Then, as illustrated in FIG. 8, the right-hand portion of the package (consisting of sections 24, 34, booklet 120, and sections 34, 24) is then rotated in the direction of arrow 124 to overlie the collapsed holder 50 and section 22 therebelow. Finally, as illustrated in FIG. 9, the left segment comprised of sections 20, 30 is rotated in the direction of arrow 126 in order to overlie the other sections and put the package in the collapsed home orientation.

Referring now to FIG. 3 in particular, the holder 50 is secured to non-overlaid section 22 of the package 10 by adhesive means 38 directly securing together both that section 22 and a surface of one of the tray 52 and base 54. As illustrated, it is the base 54 which is directly secured to the section 22 by the adhesive means 38, although in an alternative embodiment the tray 52 may be directly secured to the section 22 by the adhesive means 38. Regardless of whether it is the tray 52 or the base 54 which is secured to the non-overlaid section 22, it is a critical element of the present invention that the holder 50 is movable to its spanning configuration by movement of the non-secured or movable element (here, the tray 52) relative to the secured element (here, the base 54), the non-secured element in the spanning configuration spanning (i.e., extending across) a strip 28 and its associated foldlines 29 on either side thereof. As the base 54, the tray 52 and the interconnection therebetween are generally rigid, this limits folding of the package into the collapsed home orientation until it is opened and the tray 52 and base 54 are switched from the extended configuration into the telescoped configuration wherein neither element 52, 54 extends over a strip 28 and its associated foldlines 29.

When the holder 50 is secured to one of the end sections, such as end sections 20, 26, then the movable or non-secured element thereof can be moved over an adjacent inner section 22 or 24. When the holder 50 is secured to one of the inner sections 22 or 24, the movable element thereof can be movable either outwardly over an end section 20 or 26 (as illustrated in FIGS. 1-20 and in another embodiment in FIG. 22) or inwardly over another inner section 24 or 22 (as illustrated in the embodiment of FIG. 21). In either case, the holder 50 in its extended or spanning configuration precludes folding of the packaging 10 to its most compact configuration (as would be desirable for storage at home after purchase) and maintains the packaging 10 in an extended display orientation large enough to discourage shoplifting during display prior to purchase.

Depending on precisely which section of the first row 12 the holder 50 is affixed to and in which lateral direction the movable element thereof extends in the spanning configuration, one of the strips 28 (and possibly two or more of the strips 28) is provided with a width sufficient to enable the adjacent section of the first row 12 to fold over the holder 50, as well as any intervening sections of the first or second rows 12, 14, the booklet 120, etc.

Because the holder 50 is affixed to the uncoated front surface of section 22 a superior adherence between the holder 50 and the paperboard packaging is possible than would be the case if the holder 50 were secured directly to a coated surface (such as would be the case if there had been a section of the second row intermediate sections 30 and 34 and aligned with section 22, which was turned down about longitudinal foldline 40 to overlay section 22, with the holder 50 being secured to the exposed coated surface of that extra section). Further, because the blank 10 is in the form of 3×4 configuration rather than a 4×4 configuration, the overall thickness of the package in the collapsed home orientation is thinner than would be the case if there were that extra section.

Although the large central aperture 130 of base 54 permits viewing of a portion of the uncoated upper surface of section 22 when the holder 50 is in the spanning configuration, the exposed portion of the upper surface of section 22 is concealed from view once the holder is moved into the telescoped configuration. Accordingly, the exposed portion of the upper surface of section 22 visible through the large central aperture 130 of base 44 is an ideal location for instructions to the user as to how the tray 52 should be moved to cause the holder 50 to assume the telescoped configuration. Such instructions may be printed directly on the exposed portion of the upper surface of section 22 or may be applied to a label which is eventually secured over that exposed portion. The former arrangement has the disadvantage that an uncoated and non-multi-colored surface is at least initially visible to the user through large central aperture 130 (prior to movement of the holder to the collapsed configuration), and the latter arrangement requires the additional expense of printing and applying a label during the manufacturing process.

In the preferred embodiment of the present invention illustrated, a cut-back panel generally designated 132 presents a coated and optionally multi-colored surface visible through the large central aperture 130. The panel 132 is secured at one end to an adjacent end of a section of the second row 14 (illustrated in FIG. 1 as section 34) which will be immediately laterally adjacent the base 54 in the final package and preferably immediately laterally adjacent the trailing edge 54b thereof. The panel 132 is configured and dimensioned to fit within the large central aperture 130 of base 54 except for the portion 134 connecting it with the section 34 to which it is attached. Because the panel 132 is thus cut back (that is, smaller than a section), it does not interfere with the adhesion of the base 54 to the section 22 by means of the U-shaped pattern of glue dots 38 illustrated in FIG. 2. Further, because the panel 132 fits within the central aperture 130 of base 54, except for the connecting portion 134, it does not result in any substantial additional thickness of the package in its collapsed orientation. Finally, because the undersurface of panel 132, like the remainder of the undersurface of blank 10 in FIG. 1, is coated and optionally multi-colored, it presents to the viewer through the large central aperture 130 of base 54 a finished surface, preferably containing instructions for moving the holder to its closed configuration. It will be appreciated that the panel 132 is not glued to the section 22 so as to accommodate the slight lateral relocation thereof which will be required as the package is moved from between its extended blank orientation and either its intermediate display orientation or its collapsed home orientation.

In the preferred embodiment of the present invention illustrated, a cap generally designated 140 is provided for a variety of different reasons. Referring now to FIGS. 11 and 12, the cap 140 has a substantially planar body portion 142 with one end 144 adapted to face the forward end 40 of tray 52, the opposed end and the two sides defining raised flanges 146 and 148, respectively. Each of the longitudinally-extending flanges 148 defines an inwardly-projecting resiliently biased detent 150. The trailing end 52b of tray 52 is provided with recesses 152 (see FIG. 13), adapted to be releasably engaged by the detents 150 of cap 140. The cap 140 is preferably formed of plastic, typically a rigid or semi-rigid plastic, and may conveniently be injection molded separately or in conjunction with a holder 50, connected thereto by breakable bridges in order to permit subsequent separation.

The substantially planar body portion 144 of cap 140 is secured to section 30 adjacent the free end thereof (for example, by the thin line of glue 38 on the upper surface of section 30 illustrated in FIG. 2). If desired, in order to further reduce the thickness of the package in the collapsed home orientation, section 30 may be cut back (prior to gluing to section 20) to reveal a portion of section 20 having the outline of cap 140 so that cap 140 may be glued directly to that portion of section 20, thus eliminating another section thickness. It will be appreciated that there is room for the cap 140 on section 30 even when the holder 50 is in the spanning configuration since the end-to-end length of tray 52 cannot exceed the end-to-end length of section 22 (if the package is ever to assume a collapsed home orientation) and yet must extend partially over section 22 in the spanning configuration. When the package is moved to the collapsed home orientation illustrated in FIGS. 9 and 10, the flanges 146, 148 of cap 140 partially cover one end (i.e., a spine-like strip 28) and the sides of the package, with the detents 150 of cap 140 releasably engaging the recesses 152 of the tray 52 by a snap action in order to releasably maintain the package in its collapsed home orientation.

In addition to maintaining the package its collapsed home orientation, the cap 140 also has a function when the package is in the intermediate display orientation. As noted above, since the holder 50 in its spanning configuration does not extend out to the free end of the segment containing sections 20, 30, there will be a tendency for the free end of this segment and the opposing free end of the overlying segment containing sections 26, 36 to bow inwardly or crush under the pressure of a heat-shrunk overwrap. However the presence of cap 140 on the segment containing sections 20, 30 prevents bowing of that segment, and the upstanding flanges 146, 148 resist the tendency of the overwrap to exert a crushing or bowing force on the overlying segment containing sections 26, 36. Thus the cap plays an important role in the preferred embodiment of the present invention both when the holder is in the intermediate display orientation and when it is in the collapsed home orientation. Additionally, since the paperboard portion of the packaging is non-transparent and the plastic holder 50 is also typically non-transparent, the cap 140 may be totally transparent (or preferably just the transverse flange 146 thereof may be transparent). When the package is in the intermediate display orientation, the transparent transverse flange 146 enables the prospective purchaser of the package to confirm visually prior to purchase that a CD is present in the package (e.g., by viewing the CD through the flange 146 and the finger opening 62 adjacent thereto). When the package is stored in the collapsed home orientation, the transparent transverse flange 146 enables a viewer to easily see the title of the CD printed on a spine or edge (e.g., a strip 28) therethrough, without the need to remove the package from the storage location.

While the blank 10 is illustrated in FIG. 1 as a 3×4 configuration of sections, it will be appreciated that a variety of different configurations may be used. FIGS. 21 and 22 illustrate different embodiments of a package according to the present invention made from a blank of 1×4 configuration. In the embodiment of FIG. 21, the stationary element (typically the base 24) of the holder 50 is secured to one of the inner sections 22, 24 with the movable element of the holder (typically the tray 52) extended over the other inner section 24, 22 as illustrated in FIG. 21A for the extended blank orientation. The package is moved into the intermediate display orientation by folding the outer sections 20, 26 over the inner sections 22, 24, respectively, as indicated by the arrows, to produce the package illustrated in FIG. 21B. In the embodiment of FIG. 22, the holder 50 is secured to inner section 24 by base 54, with the tray 52 extended over the adjacent outer segment 26, as illustrated in FIG. 22A for the extended blank orientation. The package is moved into the intermediate orientation by overlaying section 24 (and base 54) and section 26 (and tray 52) with sections 22 and 20, respectively, as indicated by the arrow, to produce the package illustrated in FIG. 22B.

As another example, a 2×3 configuration may also be employed as illustrated in FIGS. 23 and 24. With such a configuration, the resultant package in the intermediate display orientation (see FIGS. 23C and 24) has one double-section segment and one non-overlaid section in one plane and another double-section segment in a second plane parallel to the first plane, with the holder 50 in the spanning configuration being secured to the non-overlaid section of the first row by the base 54 in FIG. 23 and by the tray 52 in FIG. 24. Preferably the segment in the second plane overlays the tray 52 as illustrated in FIG. 24C because the tray contains the compact disc and it is the compact disc which is most in need of protection from scratching or other damage. Alternatively, the segment in the second plane may overlay the base 54 as illustrated in FIG. 23C. Because the tray 52 containing the compact disc is not overlaid by another section when the package is in the intermediate display orientation, preferably a booklet, printed insert, or the like (not shown) is mounted over the compact disc and tray prior to overwrapping of the package in order to further protect the compact disc while the package is in the intermediate display orientation. A package formed of a blank of the configuration of FIG. 23 may also be visualized simply by ignoring the segment containing sections 26, 36 in FIGS. 1–20.

In the embodiment illustrated in FIG. 24, it is the tray 52 which is directly glued to the non-overlaid section 22, while the holder 54 is slidably movable under the tray 52 in order to enable the package to assume the collapsed home orientation. The minor modifications to the base and tray necessary to enable the tray to be the stationary element and the base to be the movable element of the holder will be obvious to those skilled in the mechanical arts in view of the teachings presented herein. If desired, for aesthetic reasons the tray may be concealed in the intermediate display orientation by means of a printed insert, booklet or the like covering the same.

Additionally, where the visual appearance of the packaging is of little concern or the blank is coated and optionally multi-color printed on both sides, a blank consisting of only one row may be used (that is, a 1×4 configuration). Alternatively, a blank of 1×6 configuration and coated on only one surface thereof may be used, with the extreme end sections being folded inwardly over and glued to the adjacent inner sections to provide a 1×4 configuration wherein the outer segments are coated and optionally multi-colored on both surfaces. If desired, a cut-back panel similar to panel 132 may also be employed to conceal the uncoated surface of the inner section to which the holder is secured. The uncoated surface of the other inner section may be concealed, if desired, by a label or the like. Clearly a variety of other configurations (e.g. a 4×4 or 3×3 configuration) may also be used, although such other configurations may not provide all of the potential advantages of the preferred configurations.

As will be readily apparent to those skilled in the CD packaging art, while the present invention has been described in terms of a package for holding a single CD, the principles of the present invention also apply to packages containing a plurality of CD's. For example, a package according to the present invention may be made from a sheet having any number of sections or segments, at least one CD holder according to the present invention, and optionally one or more conventional CD holders (that is fixedly disposed or stationary CD holders).

While the movable one of the base and tray is illustrated in the drawing as extending in the extended configuration not only across a pair of foldlines and a strip therebetween, but also a substantial portion of the adjacent section, in fact it is only required that the movable element extend across the foldlines and the strip therebetween. Accordingly, in a package design for multiple CD's, a conventional stationary CD holder may be disposed on each section adjacent the section carrying the CD holder of the present invention, so long as the movable element of the CD holder of the present invention is able to move across the strip and foldlines separating it from an adjacent section in order to move the CD holder into its extended configuration.

Naturally, where CD holders are disposed on adjacent sections, the strip intermediate the foldlines between the sections is preferably of sufficient width to accommodate the additional thickness of two CD holders rather than just one. As the package adapted to contain multiple CD's is not subject to the same "jewel box" thickness limitation (when the package is in the collapsed home orientation) as the single CD package, the disposition of the CD holders on single section segments is of lesser importance than in the single CD package although it still provides for superior adhesion of the CD holders to the section. Depending upon the number of CD's to be packaged and the configuration of the packaging, the package may contain a plurality of the CD holders of the present invention in order to provide additional rigidity to the package in its extended display orientation.

The package of the preferred invention is ecologically acceptable. There is a 10% reduction in paperboard utilization (for a 5×11½ inch package in an intermediate display orientation relative to the prior art package with a 6×12 inch display orientation) and a 20% reduction in plastic utilization relative to the jewel box. As the package will be retained by the user, if only in order to protect the CD, only the shrink-wrap which covers the package in the intermediate display orientation is discarded as waste. Depending upon the manufacturing standards set, virgin or even recycled paperboard and plastic may be used to form the package.

Even apart from the ecological considerations, the package of the present invention presents an attractive marketing opportunity. A 5×11½ inch package of the present invention in the intermediate display orientation fits into existing retailer fixtures (so that refixturing is not required), and, indeed, as the package is typically thinner (for example, up to about 30% thinner) than the current package, more packages of the present invention may be disposed on a given length of shelf. The package of the present invention uses less plastic (typically about 43% by weight less) and is lighter (typically about 20% lighter) than the current 6×12 inch package with the jewel box. The paperboard parts may be protected to a large degree against dog-earing by the use of the plastic cap. Finally, because the package of the present invention in the collapsed home orientation may be substantially equal in dimensions to the current jewel box, it can be stored in spaces presently designed to store jewel boxes. The package of the present invention is economical to manufacture, easy to assemble, and of rugged, sturdy construction.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing disclosure.

We claim:

1. A holder for a compact disc comprising:
 (A) a tray adapted to releasably receive a compact disc thereon, and
 (B) a base in telescopic relationship with said tray;
 said holder being movable from a spanning configuration wherein said base and said tray are substantially untelescoped to a telescoped configuration wherein said base and said tray are substantially overlying and non-releasable into said spanning configuration.

2. The holder of claim 1 wherein said base and said tray are disposed in a mutually slidable relationship permitting movement from said spanning configuration to said telescoped configuration.

3. The holder of claim 2 wherein one of said base and said tray defines a slideway, and the other of said base and said tray defines a slide which is slidably received within said slideway.

4. The holder of claim 1 additionally including means precluding unintended separation of said base and said tray by limiting relative untelescoping movement of said base and said tray beyond said spanning configuration.

5. The holder of claim 1 wherein said base and said tray are exclusively plastic.

6. The holder of claim 1 wherein said base and said tray are each generally rigid.

7. The holder of claim 1 additionally including adhesive means disposed on a surface of one of said base and said tray.

8. The holder of claim 1 additionally including means for locking said holder in said telescoped configuration.

9. The holder of claim 8 wherein said locking means is automatically actuated by movement of said holder to said telescoped configuration.

10. The holder of claim 1 additionally including spacing elements on said base movable between an elevated first position and a depressed second position, said spacing elements being biased towards said elevated first position and automatically assuming said depressed second position as said holder is forcibly moved to said telescoped configuration.

11. A holder for a compact disc comprising:
 (A) a generally rigid plastic tray adapted to releasably receive a compact disc thereon;
 (B) a generally rigid plastic base in telescopic relationship with said tray;
 said base and said tray being disposed in a mutually slidable relationship permitting movement from a spanning configuration wherein said base and said tray are substantially untelescoped to a telescoped configuration wherein said base and said tray are substantially overlying, one of said base and said tray defining a slideway and the other of said base and said tray defining a slide which is slidably received within said slideway;
 (C) means precluding unintended separation of said base and said tray by limiting relative untelescoping movement of said base and said tray beyond said spanning configuration;
 (D) means for locking said holder in said telescoped configuration, wherein said base and said tray are non-releasable into said spanning configuration said locking means being automatically actuated by movement of said holder to said telescoped configuration; and
 (E) spacing elements on said base movable between an elevated first position and a depressed second position, said spacing elements being biased towards said elevated first position and automatically assuming said depressed second position as said holder is forcibly moved to said telescoped configuration.

12. A package for a compact disc comprising:
 (A) a sheet defining a row having at least three rectangular sections separated from each other by foldlines, at least an adjacent two of said sections being separated from each other by a strip having a width small relative to the width of said sections, said strip being bound by foldlines, the width of said sections and said strip being predetermined so that, when said sections are folded along said foldlines, said sections overlie each other; and
 (B) at least one compact disc holder secured to a respective one of said sections, said holder including a tray adapted to releasably receive a compact disc thereon, and a base in telescopic relationship with said tray, said holder being movable from a spanning configuration wherein said base and said tray are substantially untelescoped to a telescoped configuration wherein said base and said tray are substantially overlying;
 said package being switchable from an extended blank orientation, through an intermediate display orientation, to a collapsed home orientation, said package in said blank orientation having said sections disposed in a common plane, said package in said collapsed home orientation having each of said sections substantially overlying with said holder disposed in said telescoped configuration wherein said base and said tray are substantially overlying, and said package in said intermediate display orientation having at least an adjacent pair of said sections including said respective one section and separated by said strip disposed in a first plane and at least another of said sections disposed in a second plane at least partially overlying said tray with said holder disposed in an intermediate plane in said spanning configuration wherein said base and said tray are substantially untelescoped and extend fully across said strip intermediate said pair of sections to preclude folding of said package into said collapsed home configuration prior to movement of said holder to said telescoped configuration.

13. The package of claim 12 wherein said row has at least four rectangular sections separated from each other by foldlines, and said package in said intermediate display orientation has at least another adjacent pair of said sections disposed in said second plane at least partially overlying said tray and said base.

14. The package of claim 13 wherein said another adjacent pair of said sections disposed in said second plane is separated by another of said strips and wherein said holder in said spanning configuration extends fully across said strips intermediate each of said adjacent pairs of sections.

15. The package of claim 13 wherein said base and said tray are disposed in a mutually slidable relationship permitting movement from said spanning configuration to said telescoped configuration.

16. The package of claim 14 wherein one of said base and said tray defines a slideway, and the other of said base and said tray defines a slide which is slidably received within said slideway.

17. The package of claim 12 additionally including means precluding unintended separation of said base and said tray by limiting relative untelescoping movement of said base and said tray beyond said spanning configuration.

18. The package of claim 12 wherein said base and said tray are exclusively plastic.

19. The package of claim 12 wherein said base and said tray are each generally rigid.

20. The package of claim 12 additionally including adhesive means disposed on a surface of one of said base and said tray for securing said one of said base and said tray to said respective one of said sections.

21. The package of claim 12 additionally including means for locking said holder in said telescoped configuration.

22. The package of claim 21 wherein said locking means is automatically actuated by movement of said holder to said telescoped configuration.

23. The package of claim 12 additionally including spacing elements on said base movable between an elevated first position, wherein said spacing elements assist in preventing inward bowing of said sections in said second plane when said package is in said intermediate display orientation, and a depressed second position, wherein said spacing elements do not so assist, said spacing elements being biased towards said elevated first position and automatically assuming said depressed second position as said holder is forcibly moved to said telescoped configuration.

24. The package of claim 12 additionally including means for releasably maintaining said package in said collapsed home orientation.

25. The package of claim 24 wherein said means for releasably maintaining said package in said collapsed home orientation comprises a cap secured to a section at one end of said row, in said intermediate display orientation said cap being disposed intermediate and spacing apart a pair of overlying sections, and in said collapsed home orientation said cap releasably engaging said holder to maintain said package in said collapsed home orientation.

26. The package of claim 25 wherein said holder is secured to a section adjacent said section at one end of said row.

27. The package of claim 26 wherein, in said collapsed home orientation, said section at said one end of said row is folded over once and the section at the opposite end of said row is folded over twice.

28. The package of claim 12 wherein, in said intermediate display orientation, an end pair of sections at one end of said row is folded over an end pair of sections at the other end of said row.

29. The package of claim 12 additionally including a cap adhered to the one of said sections over which the movable one of said base and said tray extends in said intermediate display orientation, said cap being of a thickness comparable to said movable one of said base and said tray to maintain said first and second planes parallel in said intermediate display orientation.

30. The package of claim 12 additionally including means for releasably locking said package in said collapsed home orientation.

31. The package of claim 30 wherein said locking means is automatically actuated to releasably lock said package in said collapsed home orientation when said package is placed in said collapsed home orientation.

32. The package of claim 30 wherein said locking means is adhered to the one of said end sections over which the movable one of said base and said tray extends in said intermediate said display orientation and releasably engages said tray when said package is in said collapsed home orientation.

33. The package of claim 29 wherein said cap includes an opposed pair of means for releasably engaging said holder to lock said package in said collapsed home orientation, said cap being disposed adjacent the free end of one of the end sections of said row and said locking means being disposed along the top and bottom of said one end section of said row.

34. The package of claim 12 wherein the sections at each end of said row in said extended blank orientation are folded over at least once to form said intermediate display orientation.

35. The package of claim 12 wherein said sheet is paperboard and said holder is plastic.

36. A package for a compact disc comprising:
(A) a sheet defining a row, said row having at least four rectangular sections separated from each other by foldlines, at least an adjacent two of said sections being separated from each other by a strip having a width small relative to the width of said sections, said strip being bound by foldlines, the width of said sections and said strip being predetermined so that when said sections are folded along said foldlines, said sections overlie each other;
(B) at least one compact disc holder adhered to a respective one of said sections, said holder including a tray adapted to releasably receive a compact disc thereon, and a base in telescopic relationship with said tray, one of said base and said tray defining a slideway and the other of said base and said tray defining a slide which is slidably received within said slideway, said holder being movable from a spanning configuration wherein said base and said tray are substantially untelescoped to a telescoped configuration wherein said base and said tray are substantially overlying, said holder including means precluding unintended separation of said base and said tray by limiting relative movement of said base and said tray beyond said spanning configuration, said base and said tray each being generally rigid and exclusively plastic;

said package being switchable from an extended blank orientation, through an intermediate display orientation, to a collapsed home orientation, said package in said blank orientation having said sections disposed in a common plane, said package in said collapsed home orientation having each of said sections substantially overlying with said holder disposed in said telescoped configuration wherein said base and said tray are substantially overlying, and said package in said intermediate display orientation having at least an adjacent pair of said sections disposed in a first plane and at least an adjacent pair of said sections disposed in a second plane overlying said first plane with said holder disposed in an intermediate plane in said spanning configuration wherein said base and said tray are substantially untelescoped and extend fully across said strip and said foldlines intermediate each of said pairs of sections to preclude folding of said package into said collapsed home configuration prior to movement of said holder to said telescoped configuration.

37. The package of claim 36 additionally including means for locking said holder in said telescoped configuration, said locking means being automatically actuated by movement of said holder to said telescoped configuration.

38. The package of claim 36 additionally including spacing elements on said base movable between an elevated first position, wherein said spacing elements assist in preventing inward bowing of said sections in said second plane when said package is in said intermediate display orientation, and a depressed second position, wherein said spacing elements do not so assist, said spacing elements being biased towards said elevated first position and automatically assuming said depressed second position as said holder is forcibly moved to said telescoped configuration.

39. The package of claim 36 additionally including means for releasably maintaining said package in said collapsed home orientation comprising a cap secured to a section at one end of said row adjacent said section to which said holder is secured, in said intermediate display orientation said cap being disposed intermediate and spacing apart a pair of overlying sections and in said collapsed home orientation said cap releasably engaging said holder to maintain said package in said collapsed home orientation with said section at said one end of said row being folded over once and the section at the opposite end of said row being folded over twice.

40. A package for a compact disc comprising:
(A) a sheet divided into at least a first row and a second row, each said row having a plurality of rectangular sections, said first row having a greater number of said sections than said second row, said rows being separated by a longitudinal foldline, said sections in said first row being separated from each other by transverse foldlines, at least an adjacent two of said sections being separated from each other by a strip having a width small relative to the width of said sections, said strip being bound by said transverse foldlines, said sections in said second row being separated from each other by slots, at least one of said sections of said second row being folded along said longitudinal foldline so that each of the thus folded sections of said second row partially overlies a respective section of said first row but does not overlie any of said transverse foldlines adjacent that section of said first row, the overlying sections being joined together to form segments, and at least one section of said first row not having an overlying section from said second row, the width of said sections in said first row, of said strips and of said slots being predetermined so that when said sections are folded along said transverse foldlines said sections overlie each other; and (B) at least one compact disc holder adhered to a respective one of said non-overlaid sections of said first row, said holder comprising a tray adapted to releasably receive a compact disc thereon, and a base in telescopic relationship with said tray, said holder being movable from a spanning configuration wherein said base and said tray are substantially untelescoped to a telescoped configuration wherein said base and said tray are substantially overlying;

said package being switchable from an extended blank orientation, through an intermediate display orientation, to a collapsed home orientation, said package in said blank orientation having said sections of said first row disposed in a common plane, said package in said collapsed home orientation having each of said sections of said first row substantially overlying with said holder disposed in said telescoped configuration wherein said base and said tray are substantially overlying, and said package in said intermediate display orientation having at least an adjacent pair of said sections of said first row including one of said non-overlaid sections and separated by said strip disposed in a first plane and at least an adjacent pair of said sections of said first row disposed in a second plane overlying said first plane with said holder disposed in an intermediate plane in said spanning configuration wherein said base and said tray are substantially untelescoped and extend fully across said strip intermediate at least one of said adjacent pairs of sections of said first row to preclude folding of said package into said collapsed home configuration prior to movement of said holder to said telescoped configuration.

41. The package of claim 40 wherein said sheet is coated on only one side, said segments having coated outer surfaces and the surface of said at least one non-overlaid section of said first row to which said at least one compact disc holder is adhered being uncoated.

42. The package of claim 41 wherein said base defines a central aperture.

43. The package of claim 42 wherein said second row additionally includes a cut-back panel smaller than a section and secured to one of said sections thereof by a transverse foldline, said cut-back panel being configured and dimensioned to only partially overlap said non-overlaid section of said first row with a substantial portion of said cut-back panel visible through said central aperture of said base and without impeding direct adherence of said holder to said non-overlaid section of said first row.

44. The package of claim 43 wherein one of said base and said tray defines a spaced pair of slideways and the other of said base and said tray defines a pair of slides which are slidably received within said slideways, said slideways securing said holder to said non-overlaid section of said first row with said cut-back panel being disposed essentially intermediate said slideways.

45. A package for a compact disc comprising:
(A) a sheet coated on only one surface and divided into at least a first row and a second row, each said row having a plurality of rectangular sections, said first row having a greater number of said sections than said second row, said rows being separated by a longitudinal foldline, said sections in said first row being separated from each other by transverse foldlines, at least an adjacent two of said sections being separated from each other by a strip having a width small relative to the width of said sections, said strip being bound by transverse foldlines, said sections in said second row being separated from each other by slots, at least one of said sections of said second row being folded along said longitudinal foldline so that each of the thus folded sections of said second row partially overlies a respective section of said first row but does not overlie any of said transverse foldlines adjacent that section of said first row, the overlying sections being joined together to form segments having both outer surfaces coated, and at least one section of said first row not having an overlying section from said second row on its uncoated surface, the width of said sections in said first row, of said strip and of said slots being predetermined so that when said sections are folded along said transverse foldlines said sections overlie each other;
(B) at least one compact disc holder adhered to the uncoated surface of a respective one of said non-overlaid sections of said first row, said holder comprising a tray adapted to releasably receive a compact disc thereon, and a base defining a central aperture in telescopic relationship with said tray, said holder being movable from a spanning configuration wherein said base and said tray are substantially untelescoped to a telescoped configuration wherein said base and said tray are substantially overlying, one of said base and said tray defining a spaced pair of slideways and the other of said base and said tray defining a pair of slides which are slidably received within said slideways, said slideways securing said holder to said non-overlaid section of said first row;
said package being switchable from an extended blank orientation, through an intermediate display orientation, to a collapsed home orientation, said package in said blank orientation having said sections of said first row disposed in a common plane, said package in said collapsed home orientation having each of said sections of said first row substantially overlying with said holder disposed in said telescoped configuration wherein said base and said tray are substantially overlying, and said package in said intermediate display orientation having at least an adjacent pair of said sections of said first row including one of said non-overlaid sections and separated by said strip disposed in a first plane and at least an adjacent pair of said sections of said first row disposed in a second plane overlying said first plane with said holder disposed in an intermediate plane in said spanning configuration wherein said base and said tray are substantially untelescoped and extend fully across said strip intermediate at least one of said adjacent pairs of sections of said first row to preclude folding of said package into said collapsed home configuration prior to movement of said holder to said telescoped configuration; and
(C) a cut-back panel of said sheet smaller than a section secured to one of said sections of said second row by a transverse foldline, said cut-back panel being configured and dimensioned to only partially overlap said non-overlaid section of said first row essentially intermediate said slideways, with a substantial portion of said cut-back panel visible through said central aperture of said base and without impeding direct adherence of said holder to said non-overlaid section of said first row.

46. A package for a compact disc suitable for use with a compact disc holder comprising:
a sheet defining a row, said row having at least four rectangular sections separated from each other by foldlines, at least an adjacent two of said sections being separated from each other by a strip having a width small relative to the width of said sections, said strip being bound by foldlines, the width of said sections and said strip being predetermined so that when said sections are folded along said foldlines, said sections overlie each other, and at least an adjacent two of said sections being separated from each other by only a single fold line;
said package being switchable from an extended blank orientation, through an intermediate display orientation, to a collapsed home orientation, said package in said blank orientation having said sections disposed in a common plane, said package in said collapsed home orientation having each of said sections substantially overlying, and said package in said intermediate display orientation having at least an adjacent pair of said sections disposed in a first plane and at least an adjacent pair of said sections disposed in a second plane overlying said adjacent sections in said first plane with space for a compact disc holder secured to one of said sections disposed in an intermediate plane.

47. The package of claim 46 additionally including means for releasably maintaining said package in said collapsed home orientation comprising a cap secured to a section at one end of said row adjacent said section to which the compact disc holder is secured, in said intermediate display orientation, said cap being disposed intermediate and spacing apart a pair of overlying sections and in said collapsed home orientation said cap releasably engaging the compact disc holder to maintain said package in said collapsed home orientation with said section at said one end of said row being folded over once and the section at the opposite end of said row being folded over twice.

48. A package for a compact disc suitable for use with a compact disc holder comprising:
a sheet divided into at least a first row and a second row, each said row having a plurality of rectangular sections, said first row having a greater number of said sections than said second row, said rows being separated by a longitudinal foldline, said sections in said first row being separated from each other by transverse foldlines, at least an adjacent two of said sections being separated from each other by a strip having a width small relative to the width of said sections, said strip being bound by said transverse foldlines, said sections in said second row being separated from each other by slots, at least one of said sections of said second row being folded along said longitudinal foldline so that each of the thus folded sections of said second row partially overlies a respective section of said first row but does not overlie any of said transverse foldlines adjacent that section of said first row, the overlying sections being joined together to form segments, and at least one section of said first row not having an overlying section from said second row, the width of said sections in said first row, of said strips and of said slots being predetermined so that when said sections are folded along said transverse foldlines said sections overlie each other;

said package being switchable from an extended blank orientation, through an intermediate display orientation, to a collapsed home orientation, said package in said blank orientation having said sections of said first row disposed in a common plane, said package in said collapsed home orientation having each of said sections of said first row substantially overlying, and said package in said intermediate display orientation having at least an adjacent pair of said sections of said first row including one of said non-overlaid sections and separated by said strip disposed in a first plane and at least an adjacent pair of said sections of said first row disposed in a second plane overlying said first plane with space for a compact disc holder secured to one of said sections disposed in an intermediate plane.

49. The package of claim 48 wherein said sheet is coated on only one side, said segments having coated outer surfaces and the surface of said at least one non-overlaid section of said first row to which the compact disc holder is adhered being uncoated.

50. The package of claim 48 wherein said second row additionally includes a cut-back panel smaller than a section and secured to one of said sections thereof by a transverse foldline, said cut-back panel being configured and dimensioned to only partially overlap said non-overlaid section of said first row with a substantial portion of said cut-back panel visible and without impeding direct adherence of the compact disc holder to said non-overlaid section of said first row.

51. A package for a compact disc suitable for use with a compact disc holder comprising:
a sheet coated on only one surface and divided into at least a first row and a second row, each said row having a plurality of rectangular sections, said first row having a greater number of said sections than said second row, said rows being separated by a longitudinal foldline, said sections in said first row being separated from each other by transverse foldlines, at least an adjacent two of said sections being separated from each other by a strip having a width small relative to the width of said sections, said strip being bound by transverse foldlines, said sections in said second row being separated from each other by slots, at least one of said sections of said second row being folded along said longitudinal foldline so that each of the thus folded sections of said second row partially overlies a respective section of said first row but does not overlie any of said transverse foldlines adjacent that section of said first row, the overlying sections being joined together to form segments having both outer surfaces coated, and at least one section of said first row not having an overlying section from said second row on its uncoated surface, the width of said sections in said first row, of said strip and of said slots being predetermined so that when said sections are folded along said transverse foldlines said sections overlie each other;

said package being switchable from an extended blank orientation, through an intermediate display orientation, to a collapsed home orientation, said package in said blank orientation having said sections of said first row disposed in a common plane, said package in said collapsed home orientation having each of said sections of said first row substantially overlying, and said package in said intermediate display orientation having at least an adjacent pair of said sections of said first row including one of said non-overlaid sections and separated by said strip disposed in a first plane and at least an adjacent pair of said sections of said first row disposed in a second plane overlying said first plane with space for a compact disc holder secured to said one non-overlaid section of said first row in an intermediate plane; and a cut-back panel of said sheet smaller than a section secured to one of said sections of said second row by a transverse foldline, said cut-back panel being configured and dimensioned to only partially overlap said non-overlaid section of said first row essentially intermediate said slideways, with a substantial portion of said cut-back panel visible through the compact disc holder and without impeding direct adherence of the compact disc holder to said one non-overlaid section of said first row.

* * * * *